US008184129B2

(12) United States Patent
Shekhar et al.

(10) Patent No.: US 8,184,129 B2
(45) Date of Patent: *May 22, 2012

(54) TECHNIQUES FOR 3-D ELASTIC SPATIAL REGISTRATION OF MULTIPLE MODES OF MEASURING A BODY

(75) Inventors: Raj Shekhar, Elkridge, MD (US); Vivek Walimbe, Pewaukee, WI (US)

(73) Assignees: University of Maryland, Baltimore, Baltimore, MD (US); Cleveland Clinic Foundation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/220,942

(22) Filed: Aug. 30, 2011

(65) Prior Publication Data
US 2011/0311118 A1    Dec. 22, 2011

Related U.S. Application Data

(62) Division of application No. 13/088,871, filed on Apr. 18, 2011, now Pat. No. 8,031,211, which is a division of application No. 12/064,628, filed as application No. PCT/US2006/033701 on Aug. 28, 2006, now Pat. No. 7,948,503.

(60) Provisional application No. 60/712,637, filed on Aug. 30, 2005.

(51) Int. Cl.
*G09G 5/00* (2006.01)

(52) U.S. Cl. ........................................ 345/648; 128/294
(58) Field of Classification Search .................. 345/648
See application file for complete search history.

(56) References Cited

U.S. PATENT DOCUMENTS

| 5,633,951 | A  | * | 5/1997  | Moshfeghi ................ 382/154 |
| 5,956,418 | A  | * | 9/1999  | Aiger et al. .............. 382/154 |
| 6,670,614 | B1 | * | 12/2003 | Plut et al. .............. 250/363.04 |
| 6,775,405 | B1 | * | 8/2004  | Zhu ..................... 382/154 |
| 7,206,462 | B1 | * | 4/2007  | Betke et al. ............. 382/280 |
| 7,280,710 | B1 | * | 10/2007 | Castro-Pareja et al. ..... 382/303 |
| 7,349,583 | B2 | * | 3/2008  | Kumar et al. ............ 382/294 |
| 7,372,984 | B2 | * | 5/2008  | Dickinson et al. ......... 382/131 |
| 7,483,034 | B2 | * | 1/2009  | Chefd'hotel et al. ....... 345/582 |
| 7,715,654 | B2 | * | 5/2010  | Chefd'hotel et al. ....... 382/294 |
| 7,822,291 | B2 | * | 10/2010 | Guetter et al. ........... 382/294 |
| 7,840,249 | B2 | * | 11/2010 | Wang et al. ............. 600/407 |
| 7,876,938 | B2 | * | 1/2011  | Huang et al. ............ 382/128 |
| 7,948,503 | B2 | * | 5/2011  | Shekhar et al. ........... 345/648 |
| 7,949,498 | B2 | * | 5/2011  | Walker et al. ............ 702/189 |
| 8,031,211 | B2 | * | 10/2011 | Shekhar et al. ........... 345/648 |

(Continued)

*Primary Examiner* — Sath V Perungavoor
(74) *Attorney, Agent, or Firm* — Evans & Molinelli PLLC; Eugene J. Molinelli

(57) ABSTRACT

Techniques for registration of multiple measurement modes of a body include receiving first and second data from different modes. Each includes measured values with coordinate values. For two mechanically aligned modes, any non-rigid registration is performed. For some modes, the non-rigid registration includes a coarse transformation and multiple fine scale transformations. The coarse transformation maximizes a coarse similarity measure. The second data is sub-divided into contiguous sub-regions. Fine transformations are determined between the sub-regions and corresponding portions of the first data to maximize a fine similarity measure. Sub-dividing and determining fine transformations repeats until stop conditions are satisfied. Transformations between the last-divided sub-regions are interpolated. Any of the fine similarity measure, a search region, interpolation method, sub-division location, and the use of rigid or non-rigid fine transformations are adaptive to properties of the first or second data so that the registration is automatic without human intervention.

7 Claims, 7 Drawing Sheets

U.S. PATENT DOCUMENTS

| | | | | |
|---|---|---|---|---|
| 2005/0089213 A1* | 4/2005 | Geng | | 382/154 |
| 2005/0190189 A1* | 9/2005 | Chefd'hotel et al. | | 345/501 |
| 2006/0093209 A1* | 5/2006 | Guetter et al. | | 382/159 |
| 2006/0247513 A1* | 11/2006 | Wang et al. | | 600/410 |
| 2006/0275745 A1* | 12/2006 | Schwarz | | 435/4 |
| 2007/0081712 A1* | 4/2007 | Huang et al. | | 382/128 |
| 2008/0265166 A1* | 10/2008 | Shekhar et al. | | 250/363.03 |
| 2008/0317317 A1* | 12/2008 | Shekhar et al. | | 382/131 |
| 2009/0116716 A1* | 5/2009 | Zhou | | 382/131 |
| 2011/0052033 A1* | 3/2011 | Shekhar et al. | | 382/131 |
| 2011/0262016 A1* | 10/2011 | Shekhar et al. | | 382/131 |

* cited by examiner

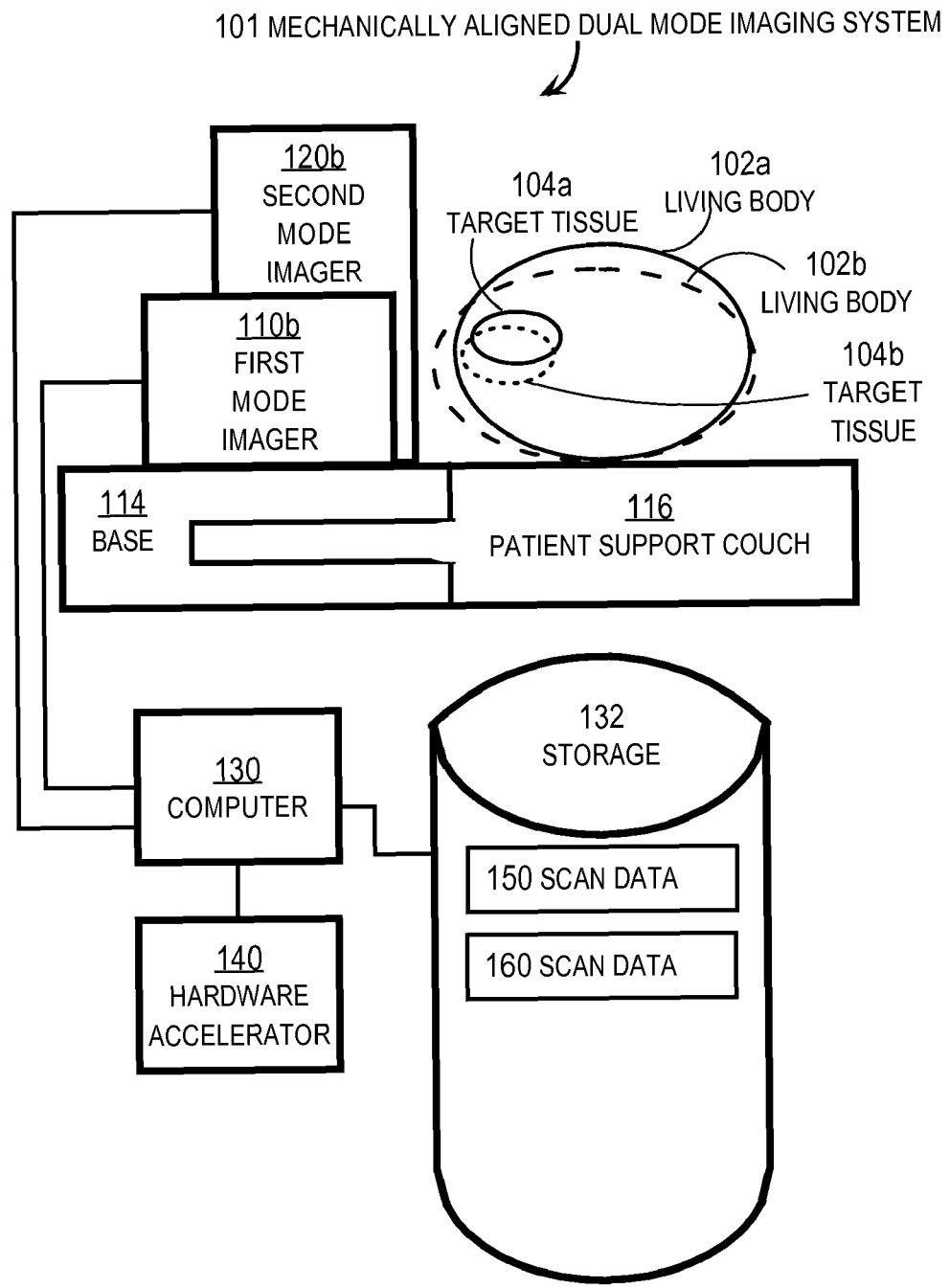

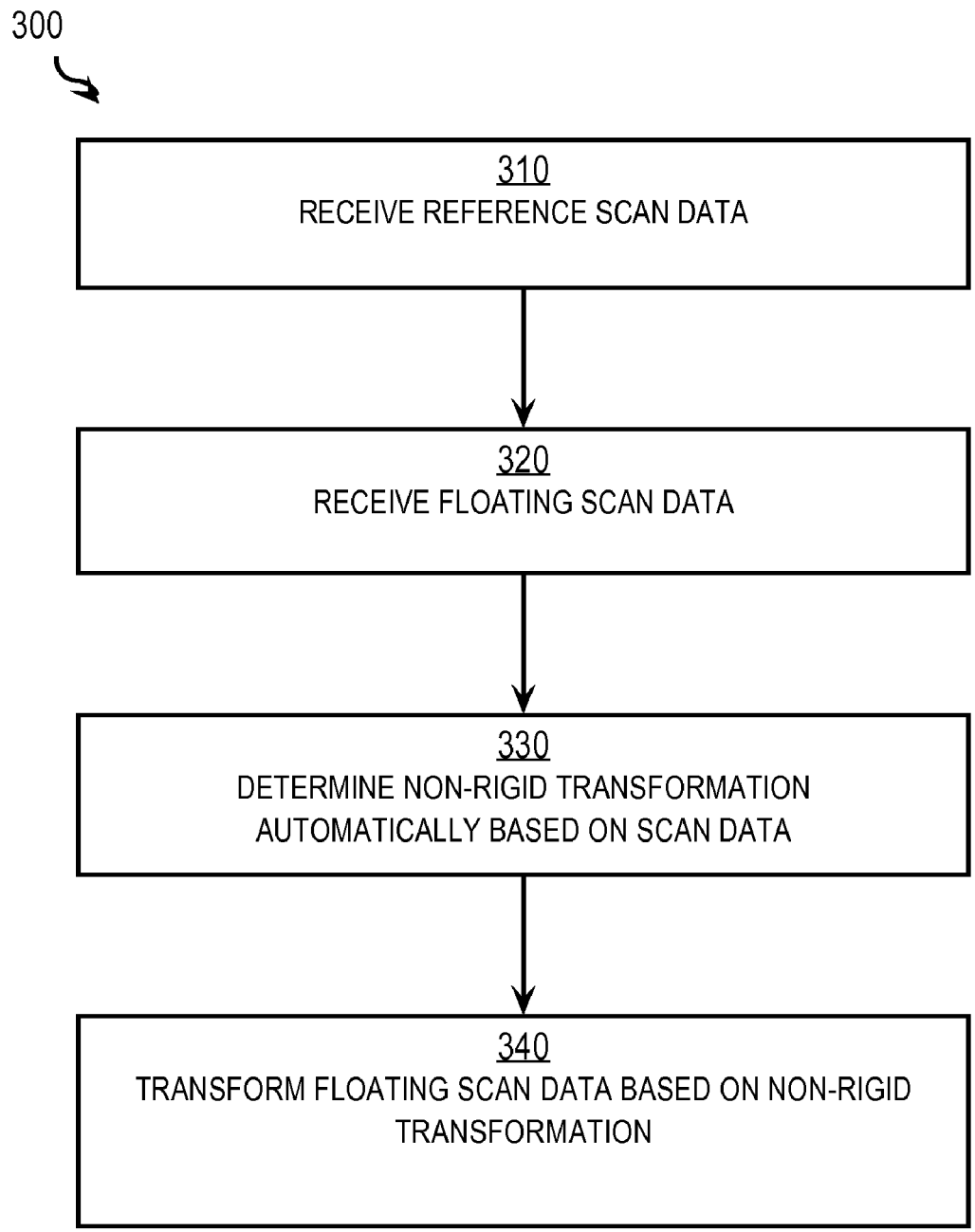

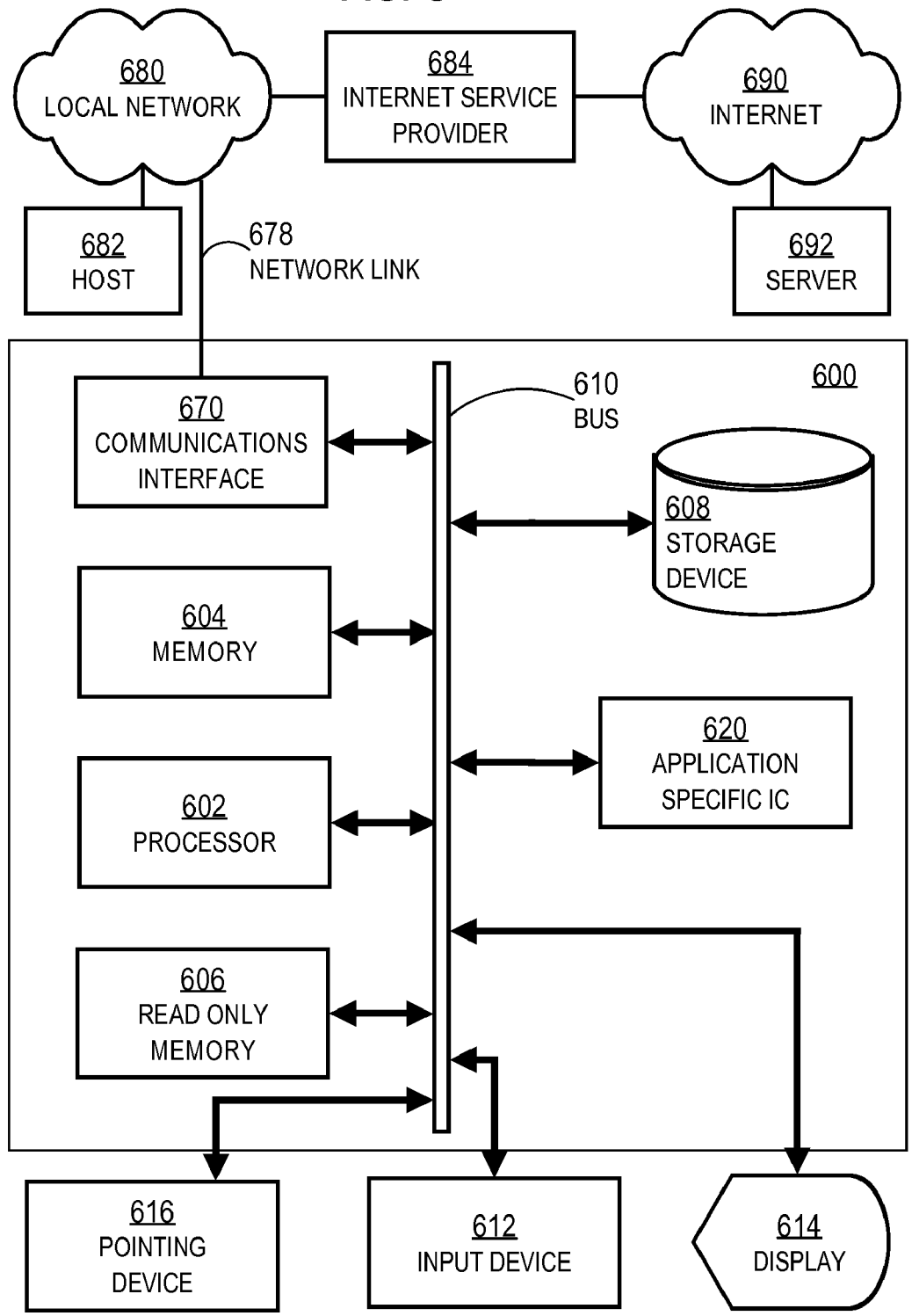

TECHNIQUES FOR 3-D ELASTIC SPATIAL REGISTRATION OF MULTIPLE MODES OF MEASURING A BODY

CROSS-REFERENCE TO RELATED APPLICATIONS

This application claims benefit as a Divisional Continuation of application Ser. No 13/088,871 filed Apr. 18, 2011 under 35 U.S.C. §120, which claims benefit as a Divisional Continuation of application Ser. No. 12/064,628, filed Feb. 23, 2008 under 35 U.S.C. §120, which claims benefit of International Application PCT/US2006/033701 filed Aug. 28, 2006, which claims benefit of Provisional Appln. 60/712,637, filed Aug. 30, 2005, the entire contents of which are hereby incorporated by reference as if fully set forth herein, under 35 U.S.C. §119(e).

BACKGROUND OF THE INVENTION

1. Field of the Invention

The present invention relates to spatially registering measured values deduced from multiple modes of measuring the same body, such as a patient, for integrated views of the body; and, in particular to elastic registration of combined scanning technologies, such as a hybrid Computer-aided Tomography (CT) Positron Emission Tomography (PET) apparatus, and adaptive elastic registration based on sub-volume division.

2. Description of the Related Art

Different sensing systems are widely known and used for non-invasively probing the interior structure of bodies. For example, X-rays and X-ray-based computer-assisted tomography (CT), nuclear magnetic resonance (NMR) and NMR-based magnetic resonance imagery (MRI), acoustic waves and acoustics-based ultrasound imagery (USI), positron emissions and positron emission tomography (PET), and optical waves have all been used to probe the human body and bodies of other animals. Some have been used to probe non-living entities such as machinery, buildings, and geological features. Full and partial body scans can be constructed by assembling sequences of images and other output produced by these systems. Each body scan produced by a sensing system is herein called a measurement mode of the target body. In general, a measurement mode produces a two-dimensional (2D) image, a three dimensional (3D) volume based on a set of images with the third dimension being either a spatial dimension or time, or a full four dimensional (4D) volume based on three spatial dimensions and time.

Various sensing systems respond to different physical phenomena, and hence provide different information about structures within the target body. The range of measurable quantities increases as tracers of various kinds are injected into the body to highlight particular structures or functions within the body when the non-invasive measurements are made. Great insight into the structural and functional properties inside the target body can be achieved by fusing the information from multiple measurement modes of the same body, either with the different sensing systems or with the same sensing system at different times during the target body's stages of operation.

For many applications that attempt to fuse the information available in multiple measurement modes, the images or volumes produced by the various measurement modes need to be matched, i.e., spatially or temporally registered, or both, so that corresponding parts of the measurement products can be compared. In some cases, the registration is easy because the sensing systems generate products of the same time and space resolution and scale while the body was stationary between measurements. In general however, the measurement product of one system has a different scale or resolution in time or space or both, with a different response to each volume element, and the target body is not stationary over the time scale of the various temporal resolutions. Consequently, more sophisticated registration of measurement products is needed.

For example, the information in CT scans provides tissue arrangements and the information in PET scans provides cellular function. However, CT body scans are produced by snapshots of a patient in one pose during a maximum inspiration phase of a patient's breathing cycle; while PET body scans are produced by measurements at lower spatial and temporal resolution, encompassing several minutes that represent an average over the patient's breathing cycle. In some circumstances the patient is in a different pose for the PET scan than for the CT scan.

An approach to automatically register PET and CT images, which addresses these issues was published by Vivek Walimbe, Vladimir Zagrodsky, Shanker Raja, Bohdan Bybel, Mangesh Kanvinde and Raj Shekhar, "Elastic registration of three-dimensional whole body CT and PET images by quarternion-based interpolation of multiple piecewise linear rigid-body registrations," *Medical Imaging* 2004: Image Processing, edited by J. Michael Fitzpatrick, Milan Sonka, Proceedings of SPIE Vol 5370, pp. 119-128, SPIE, Bellingham, Wash., February 2004 (hereinafter Walimbe) and is hereby incorporated by reference as if fully set forth herein. Walimbe makes use of normalized mutual information (NMI) based rigid-body registration adapted in a procedure described in R. Shekhar and V. Zagrodsky, "Mutual information-based rigid and nonrigid registration of ultrasound volumes," IEEE Trans. Med. Imaging, vol. 21, pp 9-22, 2002 (hereinafter Shekhar I), the entire contents of which are hereby incorporated by reference as if fully set forth herein. The Walimbe approach first does a rigid-body registration for a floating 3D PET scan relative to a reference 3D CT scan, then breaks one scan into multiple 3D sub-volumes and does a rigid body correction on each sub-volume. The process is continued at further levels of sub-dividing 3D volumes until a minimum number (4096) of volume elements (voxels) is no longer available in a sub-volume. A voxel is a spatial element that has a single measurement value. The net sub-volume rigid registrations are interpolated onto a fine mesh grid appropriate to the CT spatial resolution using bi-linear interpolation to provide an elastic registration for the whole PET scan. A significant innovation of the Walimbe approach is the inclusion of 3D angular registrations at each sub-volume, and interpolation of angles using quaternion angular coordinates. The approach is applicable and can be extended readily to both 2D and 4D scans as well.

While the approach of Walimbe both speeds and improves registration accuracy compared to prior approaches, and is suitable for many purposes, the approach does have some remaining deficiencies. For example, using fixed values for some parameters of the method, some sub-volumes can not be used reliably in some circumstances because of low information content compared to a global histogram of mutual information.

In another approach, PET sensors and CT sensors are combined in a hybrid apparatus with fixed geometries relative to a patient couch and uses mechanical registration to reduce the variability in time, patient condition, and patient position between the different measurement modes. While suitable for reducing variability, important variability is not eliminated, and patient breathing differences and shifting continue to introduce misalignments of features of interest.

Based on the foregoing, there is a clear need for techniques to perform interpolation of sub-volume registrations that do not suffer the deficiencies of prior art approaches and are adaptive to the particular measurement modes being registered.

In particular, there is a need for techniques able to further reduce the residual misalignments between multiple sensors in a combined apparatus.

SUMMARY OF THE INVENTION

Techniques for adaptive non-rigid registration of multiple measurement modes of a target body include receiving first data and second data. First data includes a first set of measured values each associated with multiple coordinate values for spatial or temporal dimensions based on a first measurement device for measuring a target body. Second data includes a second set of measured values each associated with multiple coordinate values for spatial or temporal dimensions based on a different second measurement device for measuring the target body.

In a first set of embodiments, a method includes receiving first data and second data. The first measurement device and the second measurement device are mounted on the same combined apparatus and are mechanically aligned. A non-rigid transform is determined between the first data and the second data without human intervention based on the first data and the second data. The non-rigid transform determines changes in the coordinate values for each of the measured values of the second data to increase a measure of similarity between a measured value of the first data and a nearby measured value of the second data, which changes are not accounted for by a constant value for a three dimensional translation and a constant value for a three dimensional rotation over the measured values of the second data. The coordinate values for each measured value of the second data are transformed based on the non-rigid transform.

In another set of embodiments, a method includes receiving first data and second data. A coarse scale transformation is determined to maximize a coarse scale similarity measure between the first data and the second data. The second data is sub-divided into multiple sub-regions each comprising a spatially or temporally contiguous subset of the second data. An adaptive bin size is determined for a mutual histogram based on a sample distribution for each sub-region. A fine scale similarity measure is determined between the sub-regions and corresponding portions of the first data based on the mutual histogram with the adaptive bin size. Multiple fine scale transformations are determined to maximize the fine scale similarity measure. The coordinate values for each measured value of the second data are transformed based on the multiple fine scale transformations.

In another set of embodiments, a method includes receiving first data and second data. A coarse scale transformation is determined to maximize a coarse scale similarity measure between the first data and the second data. The second data is sub-divided into multiple sub-regions each comprising a spatially or temporally contiguous subset of the second data. Multiple fine scale transformations are determined to maximize a fine scale similarity measure between the sub-regions and corresponding portions of the first data. No fine scale transformation causes an effective displacement greater than a particular threshold. The coordinate values for each measured value of the second data are transformed based on the multiple fine scale transformations.

In another set of embodiments, a method includes receiving first data and second data. A linear transformation is determined to maximize a coarse scale similarity measure between the first data and the second data. The second data is sub-divided into multiple sub-regions each comprising a spatially or temporally contiguous subset of the second data. Multiple non-rigid transformations are determined to maximize a fine scale similarity measure between the sub-regions and corresponding portions of the first data. The coordinate values for each measured value of the second data are transformed based on the plurality of non-rigid transformations.

In another set of embodiments, a method includes receiving first data and second data. Coordinate values for each dimension fall in a range of values. A coarse scale transformation is determined to maximize a coarse scale similarity measure between the first data and the second data. The second data is sub-divided into multiple sub-regions each comprising a spatially or temporally contiguous subset of the second data by dividing at least one of the spatial or temporal dimensions at a division position substantively different from a midpoint of the range of values for that dimension. Multiple fine scale transformations are determined to maximize a fine scale similarity measure between the sub-regions and corresponding portions of the first data. The coordinate values for each measured value of the second data are transformed based on the fine scale transformations.

In other sets of embodiments, a computer readable medium and an apparatus perform one or more steps of the above methods.

BRIEF DESCRIPTION OF THE DRAWINGS

The present invention is illustrated by way of example, and not by way of limitation, in the figures of the accompanying drawings and in which like reference numerals refer to similar elements and in which

FIG. 1B is a block diagram that illustrates a system for registering two mode of imaging a body mechanically aligned in a combined apparatus;

FIG. 3 is a flow diagram illustrates an elastic registration method, according to an embodiment;

FIG. 6 is a block diagram that illustrates a computer system upon which an embodiment of the invention may be implemented.

DETAILED DESCRIPTION

Figure 1A:
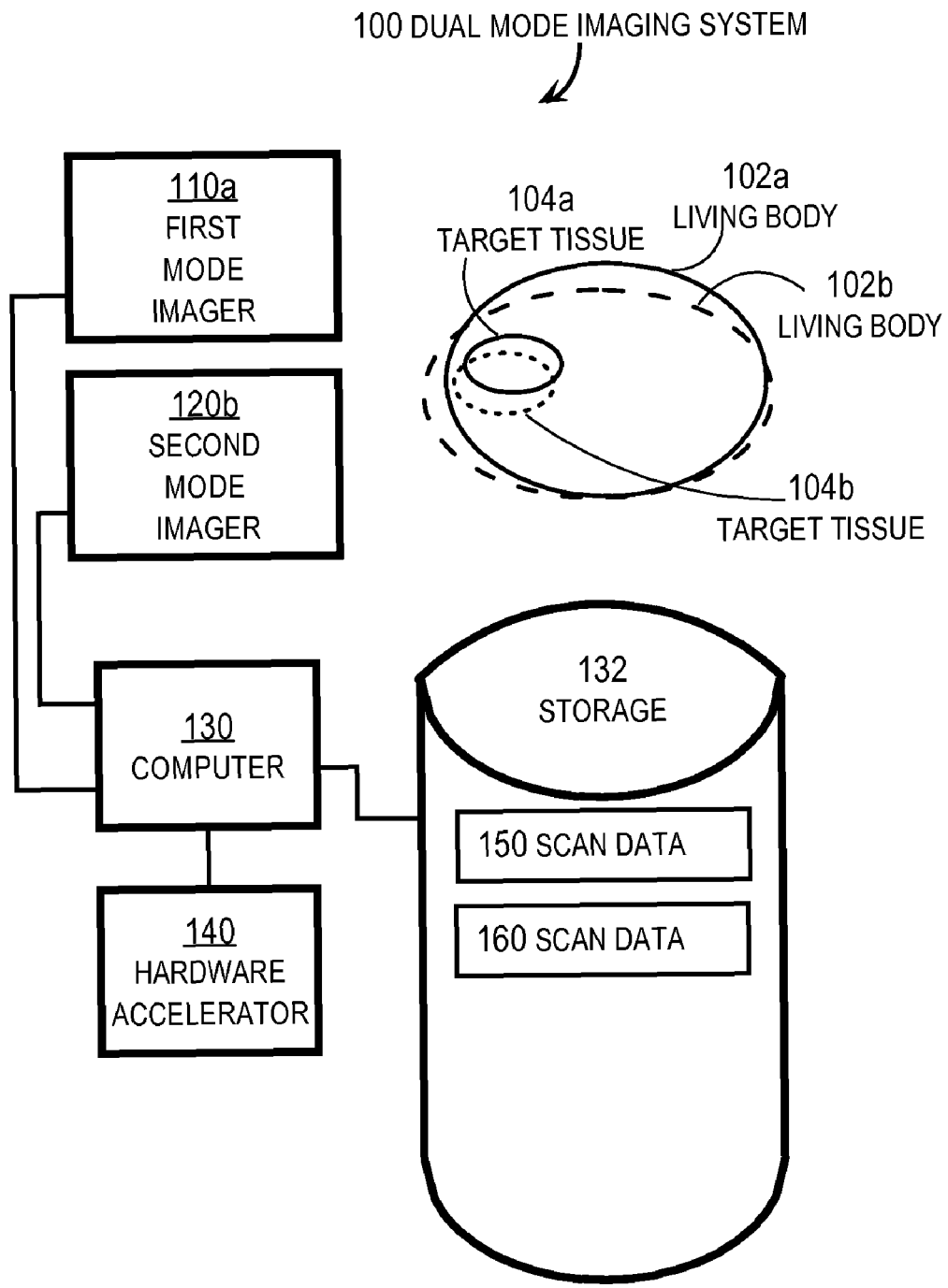
FIG. 1A is a block diagram that illustrates a system for registering two modes of imaging a body.

Techniques for adaptive registration of sub-volumes are described. In these descriptions, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are descried below in the context of spatially 3D CT and PET scans with sub-volumes using mutual information as a similarity measure. However, the invention is not limited to this context. In other embodiments, two or more 2D, temporally varying 2D, 4D and higher dimensional scans based on the same or different sensing systems of the human body or other living and non-living bodies are registered elastically on a coarse scale, or elastically using sub-regions with adaptive registration using any similarity measure followed by interpolation or not.

As used here a region is a portion of a measurement product, whether the product has one or more spatial dimensions with or without a temporal dimension. For spatial 3D measurement products, a sub-region is the same as a sub-volume as described elsewhere herein. Elastic registration is used to refer to any non-rigid registration. Rigid registration includes translation and rotation of a whole scan; every pixel or voxel is translated and rotated from the same origin and axes by the same displacement and angular rotation. This rigid-body registration is also called global translation and rotation. Elastic registration includes linear non-rigid transformations, such as scale changes (compression and expansion, called positive and negative compression herein for convenience) and shear (linear changes in translation along each spatial axis). Elastic registration includes non-linear transformation, in which at least one of the components of translation, rotation, compression and shear change non-linearly with position in the scanned data.

For example, in some embodiments, elastic registration using adaptive sub-volume registration is applied to CT images of a human body taken at different stages of breathing. In some embodiments, elastic registration is applied to mechanically aligned CT and PET scan from a combined apparatus.

Measurement data is received and used in these embodiments. Any method may be used to receive the measurement data, including, but not limited to predefined data stored within source code or in files stored with executable code ("default values") or in files or a database accessible to the process, human input either in response to prompts from the process or independently of prompts, or from data included in a message sent to the end node by another process, either unsolicited or in response to a request message.

The methods of the present invention can be implemented on any hardware, using any combination of instructions for a programmable processor and logic circuitry, including field programmable gate arrays, and special hardware designed for the purpose. The hardware of a general purpose computer, used in some embodiments, is described in a later section.

1. Structural Overview

In the embodiments described herein, one scan is elastically registered to another scan in order to determine changes in soft tissue spatial arrangements. The general problem in this context is described herein with reference to FIG. 1A. FIG. 1A is a block diagram that illustrates a system for registering two modes of imaging a body. As used herein, target tissue is a tissue type within a living body that changes its spatial arrangement with time in a manner that is significant for directed treatment. It is not implied that the target tissue necessarily does or does not undergo any net translation.

The system 100 is for determining the spatial arrangement of soft target tissue in a living body. For purposes of illustration, a living body is depicted but is not part of the system 100. In the illustrated embodiment, a living body is depicted in a first spatial arrangement 102a at one time and includes a target tissue in a corresponding spatial arrangement 104a. At a different time, the same living body is in a second spatial arrangement 102b that includes the same target tissue in a different corresponding spatial arrangement 104b.

In the illustrated embodiment, system 100 includes a first mode imager 110a, such as a full dose CT scanner, a PET scanner, an MRI scanner, a single photon emission tomography (SPECT) scanner and an ultrasound scanner. The system includes second mode imager 120a, which in various embodiments is the same or a different scanner. In some embodiments the second scanner is omitted, and both measurements modes are taken by the first mode scanner operating at different times, in some embodiments with different settings or with different tracers injected into patient, or both.

In system 100, data from the imagers 110a, 120a are received at a computer 130 and stored on storage device 132. Computer systems and storage devices like 130, 132, respectively, are described in more detail in a later section. Scan data 150, 160 based on data measured at imagers 110, 120, respectively, are stored on storage device 132.

System 100 includes a hardware accelerator 140 for speeding one or more processing steps performed on scan data 150, 160, as described in more detail below. For example, hardware accelerator 140 is implemented as an application specific integrated circuit (ASIC) as described in more detail in a later section, or a field-programmable gate array (FPGA). The term logic circuits is used herein to indicate any arrangement of hardware (whether mechanical, electrical, optical, quantum or other) that performs a logical function.

In various embodiments of the invention, temporal changes in the spatial arrangements 104a, 104b of the target tissue are determined by performing elastic registration between first mode scan data 150 and second mode scan data 160. The first mode scan is the reference scan and second mode scan is the floating scan.

FIG. 1B is a block diagram that illustrates a system 101 for registering two modes of imaging a body, wherein the two modes are mechanically aligned in a combined apparatus. In system 101, the first mode imager 110b and the second mode imager 120b are two separate instruments, typically of different types. For example, in an illustrated embodiment, the first mode imager 110b is a CT scanner and the second mode imager 120b is a PET scanner of a hybrid CT/PET scanner, such as the BIOGRAPH SENSATION 16 hybrid scanner of SIEMENS of New York, N.Y. The first mode imager and second mode imager are mounted on a base 114 attached to a patient support couch 116. By virtue of their mounting to base 114, the geometrical relationship of the first mode imager 110a and second mode imager 120b is fixed and can be calibrated for subsequent measurements. Thus the two imagers are mechanically aligned. When a patient is properly positioned on couch 116, the geometrical relationship of patient to first mode imager and second mode imager is also known to first order. In some embodiments, the patient support couch 116 and the base 114 move with respect to each other during measurements. In practice one is typically stationary and the other moves. The other elements of system 101 are as described above for system 100.

The first mode imagers 110a, 110b in systems 100, 101, respectively, are collectively referenced hereinafter as first mode imager 110. Similarly, second mode imagers 120a, 120b in systems 100, 101, respectively, are collectively referenced hereinafter as second mode imager 120.

Although system 100 and system 101 are depicted with a particular number of imagers 110, 120, computers 130, hardware accelerators 140 and scan data 150, 160 on storage device 132 for purposes of illustration; in other embodiments more or fewer imagers 110, 120, computers 130, accelerators 140, storage devices 132 and scan data 150, 160 constitute an imaging system for determining spatial arrangement of changing tissue.

Figure 2A:
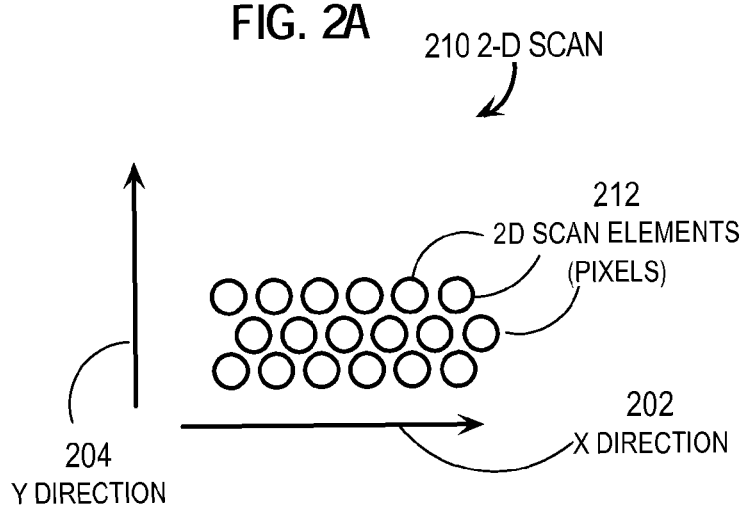
FIG. 2A is a block diagram that illustrates scan elements in a 2D scan.

FIG. 2A is a block diagram that illustrates scan elements in a 2D scan 210, such as one slice from a CT scanner. The two dimensions of the scan 210 are represented by the x direction arrow 202 and the y direction arrow 204. The scan 210 consists of a two dimensional array of 2D scan elements (pixels) 212 each with an associated position. A value at each scan element position represents a measured or computed intensity that represents a physical property (e.g., X-ray absorption) at a corresponding position in at least a portion of the spatial arrangement 102a, 102b of the living body. Although a particular number and arrangement of equal sized circular scan elements 212 are shown for purposes of illustration, in other embodiments, more elements in the same or different arrangement with the same or different sizes and shapes are included in a 2D scan.

Figure 2B:
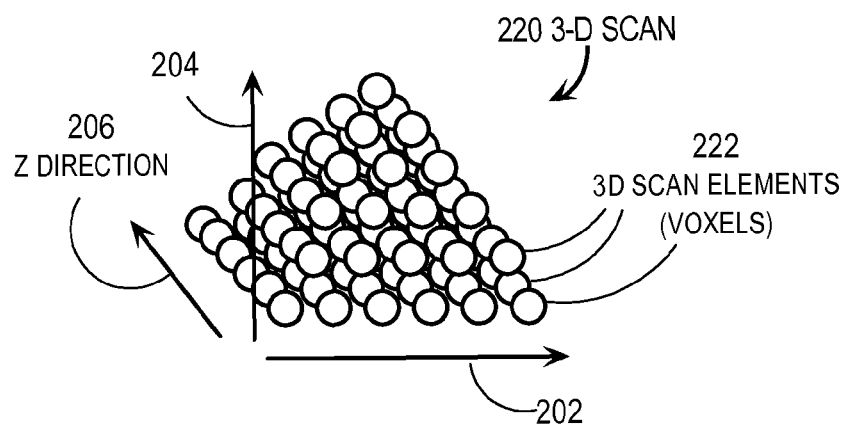
FIG. 2B is a block diagram that illustrates scan elements in a 3D scan.

FIG. 2B is a block diagram that illustrates scan elements in a 3D scan 220, such as stacked multiple slices from a CT scanner. The three dimensions of the scan are represented by the x direction arrow 202, the y direction arrow 204, and the z direction arrow 206. The scan 220 consists of a three dimensional array of 3D scan elements (voxels) 222 each with an associated position. A value at each scan element position represents a measured or computed intensity that represents a physical property (e.g., X-ray absorption or acoustic reflectivity) at a corresponding position in at least a portion of the spatial arrangement 102a, 102b of the living body. Although a particular number and arrangement of equal sized spherical scan elements 222 are shown for purposes of illustration, in other embodiments, more elements in the same or different arrangement with the same or different sizes and shapes are included in a 3D scan 220.

Figure 2C:
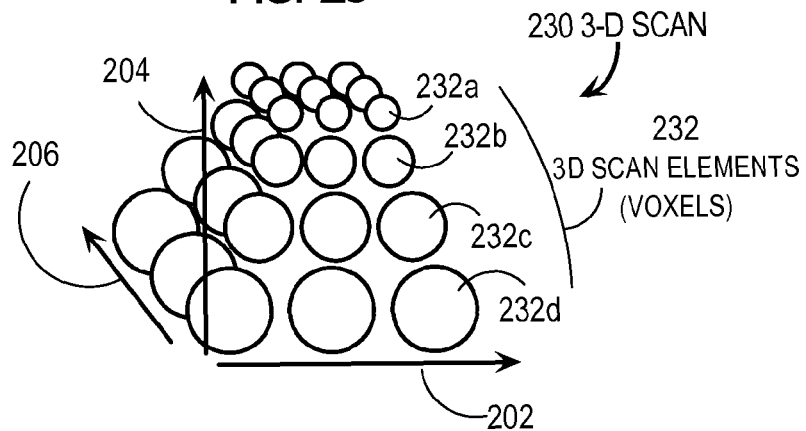
FIG. 2C is a block diagram that illustrates different scan elements in a 3D scan.

FIG. 2C is a block diagram that illustrates different scan elements in a 3D scan 230, such as from time-gated acoustic beams in a 3D acoustic scanner. The three dimensions of the scan are represented by the x direction arrow 202, the y direction arrow 204, and the z direction arrow 206. The scan 230 consists of a three dimensional array of 3D scan elements (voxels) 232 each with an associated position. In scan 230 nine beams penetrate the volume with increasing voxel size along the beam. For example, voxels 232a, 232b, 232c, 232d represent acoustic energy returned in corresponding four time windows that represent propagation of sound through corresponding distance segments in the living body. Although a particular number and arrangement of spherical scan elements 232 are shown for purposes of illustration, in other embodiments, more elements in the same or different arrangement with the same or different sizes and shapes are included in a 3D scan 230. For example, 3D acoustic voxels expand in size in the x-z plane formed by x-direction arrow 202 and z-direction arrow 206 but remain constant in size in the y-direction arrow 204, unlike the voxels depicted. Four dimensional (4D) scans are generated by a time series of 3D scans. Higher dimensional scans are possible in some applications, with the higher dimension representing variability in a different parameter, such as a scanner physical setting or an amount of tracer injected.

In the following, the term voxels is used interchangeably with the term scan elements to mean both voxels and pixels. Similarly the term images is used interchangeably with the term scans to mean 2D scans, 3D scans and higher dimensional scans. Certain voxels in the scan data are associated with the target tissue. The spatial arrangement of the target tissue is represented by the set of voxels that are associated with the target tissue, or by a boundary between such voxels and surrounding voxels.

Image registration is the process of aligning two or more images that represent the same object, where the images may be taken from different viewpoints or with different sensors or at different times or some combination. A transformation that aligns two images can be classified as rigid, linear elastic (affine), or non-linear elastic. Rigid transformations include translation or rotation or both; the others are non-rigid. Affine transformations are linear elastic transformations that add shear or compression changes or both. A non-linear elastic transformation is a special case of a non-rigid transformation that allows for local adaptivity (e.g., uses a transform that varies with position within the scan) and is typically constrained to be continuous and smooth. Volume division registration described by Walimbe is a collection of piecewise rigid-body transformations stitched together to form globally a non-linear elastic transformation.

Automatic registration is performed by defining a measure of similarity between two scans and selecting a transform that maximizes the measure of similarity. Any known measure of similarity may be used. In several illustrated embodiments, the measure of similarity is called mutual information (MI), or its variant normalized MI (NMI), both of which are well known in the art.

In some embodiments, elastic transformations are implemented in whole or in part in hardware to speed the computation of the spatially dependent transforms. For example, as described in U.S. patent application Ser. No. 10/443,249 and in C. R. Castro-Pareja, J. M. Jagadeesh, R. Shekhar, IEEE Transactions on Information Technology in Biomedicine, vol. 7, no. 4, pp. 426-434, 2003, the entire contents of each of which are hereby incorporated by reference as if fully set forth herein, fast memory and cubic addressing are used to store and access the two scans and determine and store a joint mutual histogram (MH) used in the computation of MI.

2. Method

FIG. 3 is a flow diagram that illustrates an elastic registration method 300 at a high level, according to an embodiment. Although steps are shown in FIG. 3 and subsequent flow diagrams in a particular order for purposes of illustration, in other embodiments one or more steps may be performed in a different order or overlapping in time or omitted or changed in some combination of ways.

In step 310, reference scan data is received. For example, reference scan data is received from first mode imager 110.

In step 320, floating scan data is received. For example, floating scan data is received from second mode imager 120.

In step 330, a non-rigid transformation is determined automatically to change the coordinates of the floating scan data to map similar features to the locations of those features in the reference scan data. Any non-rigid transformation may be used in some embodiments. For example, in embodiments with mechanically aligned imagers, any linear or non-linear elastic transformation is used to correct for residual deformations not accounted for by the rigid body transformations of the mechanical alignment. In some embodiments, a global affine transformation is used to register a PET image to a CT image in a hybrid scanner. In the illustrated embodiments, the non-rigid transformation is a modified version of volume division registration, called herein adaptive sub-volume registration, as described in more detail below, with reference to FIG. 4.

In step 340, the floating image is transformed to match the locations of features in the reference image based on the non-rigid transformation determined in step 330.

Figure 4:
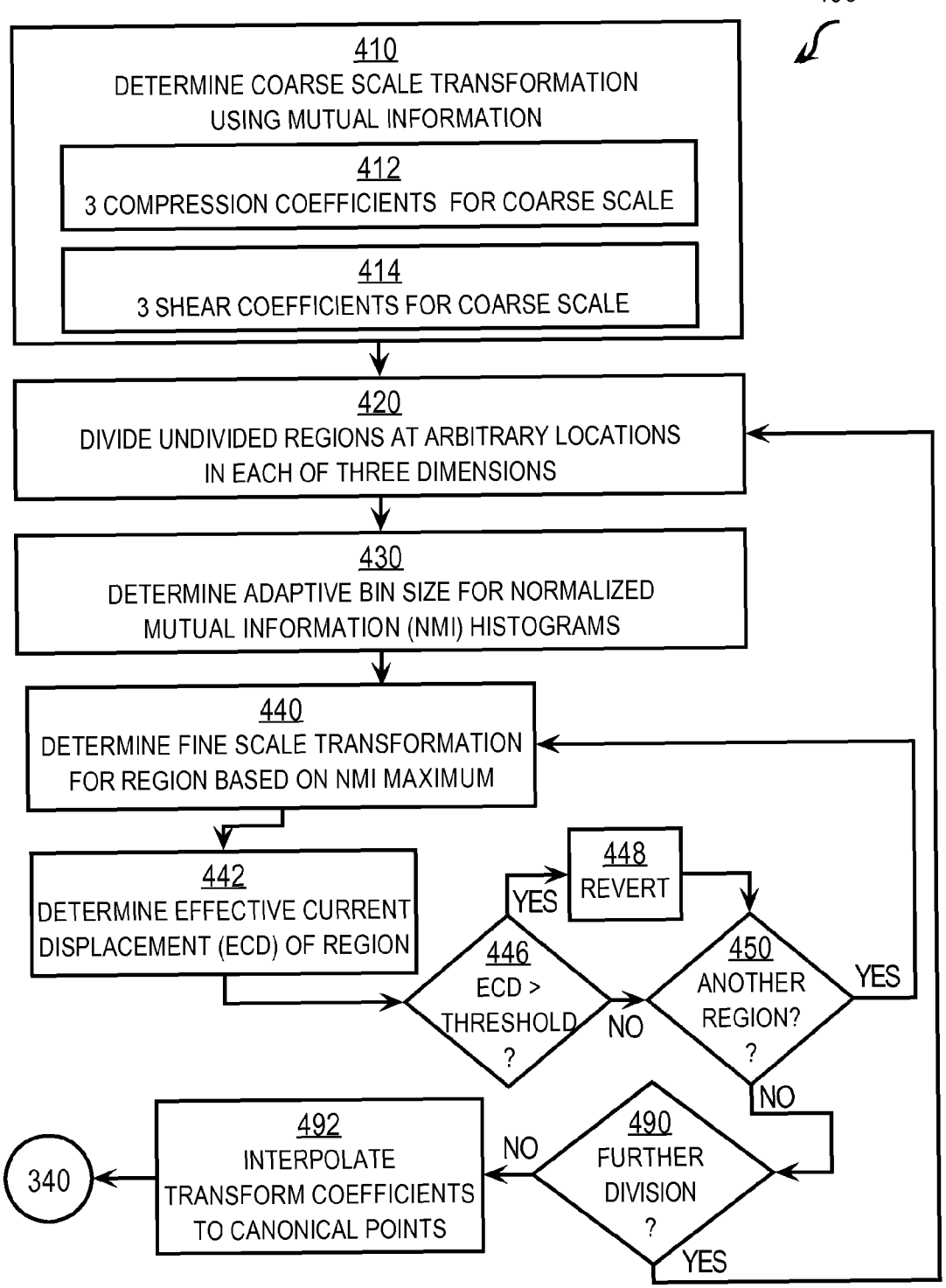
FIG. 4 is a flow diagram that illustrates the non-rigid registration step of the method of FIG. 3, according to an embodiment.

FIG. 4 is a flow diagram that illustrates the non-rigid registration step of the method of FIG. 3, according to an illustrated embodiment.

In step 410 a coarse scale transform is determined based on normalized mutual information. Normalized mutual information (NMI) as a similarity measure is described in Shekhar I. In various embodiments, the coarse scale is a global scale for the entirety of the two scans or a portion of interest in the two scans.

In some embodiments, NMI is maximized for six coefficients corresponding to three translational and three rotational components of the transform. In the illustrated embodiment step 410 includes step 412 and step 414. In step 412, three compression coefficients for the coarse scale are included in the transformation to maximize NMI. In step 414, three shear coefficients for the coarse scale are included in the transformation to maximize NMI.

In some embodiments, one or both of step 412 and step 414 are omitted. In some embodiments, it is assumed that the six coefficients for translation and rotation are zero because the mechanical alignment of a combined apparatus already accounts for these six coefficients sufficiently. In some embodiments, a transformation of arbitrary complexity with multiple parameters is applied in step 410 to maximize normalized mutual information on a coarse scale. In some embodiments step 410 is omitted entirely.

In step 420, an undivided region is subdivided at arbitrary locations in each of up to the maximum number of dimensions for the scan. In some embodiments, as described in Walimbe, each undivided 3D region is divided at midpoints of each of three dimensions to form octants. In some embodiments, the dividing point in each dimension is selected based on some other criterion, such as to be anatomically relevant or data relevant. For example, in some embodiments a region that includes a boundary of a model of an anatomical feature is divided at the boundary in each dimension that crosses that boundary. The American Society of Echocardiology (ASE) recommends a 17-segment model of a left ventricle of a human heart, which is appropriate for a dividing location of an undivided region in some embodiments. In some embodiments, the dividing point in each dimension is selected to be data relevant, for example at a reflection horizon in an echogram. It is anticipated, for example, that for registration of 3D echocardiography images with SPECT, the 3D echocardiography images would be subdivided at such a boundary to recover the non-linear mismatch between perfusion information represented by SPECT and anatomy represented by from echocardiography.

In step 430 an adaptive bin size is determined for the normalized mutual information histograms for the still undivided region. In some embodiments, a fixed bin size is used for all levels of sub-volume division, as described in Walimbe. A mutual information histogram is based on a joint histogram. The joint histogram indicates a number of the scan elements that have intensity values based on the reference scan in a first range of intensities and have corresponding intensity values based on the floating scan in a second range of intensities given the current coordinates for those scan elements. The intensity range bin size for each axis of the joint histogram is determined by an optimal bin width for a histogram based on sample size, as given by Izenman (A. J. Izenman, Recent Developments in nonparametric density estimation, J. Am. Statistical Assoc. 86 (1991) 205-224). This optimal bin size is given by Equation 1.

$$h = 2 \cdot IQR \cdot n^{-1/3} \quad (1.)$$

where h is the bin size in intensity units, IQR is the interquartile range defined as the difference between the $75^{th}$ percentile intensity and the $25^{th}$ percentile intensity, and n is the count of scan elements for the undivided region.

At each level of dividing regions, the sample size n decreases and the average range of intensities within a region, IQR, is also expected to decrease, though not at a matched rate. As a consequence, at each level of division, the appropriate bin size is expected to change. Thus in step 430 a bin size for the computation of mutual histograms is determined for the current level of division. The intensity range in the reference and floating images for regions of the current size are determined and used in Equation 1 to determine the bin sizes for reference scan intensities and the floating scan intensities, respectively. This step allows setting mutual histogram size according to the imaging modalities involved in registration, and prevents sparseness of the MH due to unnecessarily narrow bin size.

In step 440, the fine scale transformation for the region is determined. In some embodiments, the six coefficients rigid-body transform is used for the region. In some embodiments fewer coefficients are employed. In some embodiments, higher order transforms are used. For example, in some embodiments, up to three shear and three compression coefficients are also included along with up to three translation and up to three rotational coefficients. During step 440, coefficients are varied and NMI is calculated for each variation until a maximum NMI is achieved. Any method may be used to find the coefficient mix that maximizes NMI. In an illustrated embodiment, an iterative method is used, as described in Walimbe, until successive changes in coefficients increases NMI by less than 0.1% or 200 iterations are performed, whichever occurs first. In an illustrated embodiment, the method for finding the coefficients that provide maximum NMI is a modified multi-functional downhill simplex method reported by V. Zagrodsky, R. Shekhar, J. F. Cornhill, "Multi-function extension of simplex optimization method for mutual information based registration of ultrasound volumes," Proceedings of SPIE—The International Society for Optical Engineering, vol. 4322, pp 508-515, 2001, the entire contents of which are hereby incorporated by reference as if fully set forth herein.

In step 442 an effective current displacement (ECD) is computed. The ECD is the net displacement of the region resulting from the corresponding fine scale transformation. In an illustrated embodiment, to account for the translational as well as rotational information of the fine scale transformation, ECD is calculated as an average of displacements due to the fine scale transformation at the centers of octants of the still undivided region. The ECD is used to determine in step 446 (described next) whether the computed fine scale transform is excessive and likely to lead to folding or other undesirable effects, such as a region drifting too far from it starting location. In Walimbe, this ECD is not calculated; rather it is determined whether any of the three individual translation components are excessive or any of the three individual rotation components are excessive. It is more accurate to set constraints on the overall effect of a transformation rather than its individual components.

In step 446, it is determined whether the ECD exceeds a threshold. This check is included to prevent excessive displacements of regions. It has been found that a folding artifact in a transformed image can be avoided by setting the threshold at each hierarchical level to about 25% of a smallest region dimension at that level of division. This same threshold is used in Walimbe but is tested against individual translation components and not a net measure like ECD. Walimbe also tests whether any of the three rotation components exceeds a quaternion rotation equivalent of 30 degrees. Such a test is unnecessary when ECD is used as the measure of effect of the fine scale transformation.

In some embodiments, step 442 is omitted and the check in step 446 is replaced by multiple checks that displacements for each individual translation or rotations for each individual rotation exceeds a displacement threshold or rotation threshold, as described in Walimbe.

If it is determined in step 446 that ECD does not exceed the threshold, then control passes to step 450 to determine whether there is another region at the current level of division. As a result, at each level of dividing regions (called herein a hierarchical level), the transformation for a given subvolume is updated if the NMI maximum results in ECD no larger than a preset maximum allowable value for the given hierarchical level—the threshold. However, if it is determined that ECD does exceed the threshold, then control passes to step 448.

In step 448, the fine scale transformation for the current region is discarded, and the transformation reverts to the transformation of the larger region of which the region is part, as determined at the previous level of division. As a result, at each hierarchical level, the transformation for a given subvolume is not updated if the NMI maximum results in ECD greater than the preset maximum allowable value for the given hierarchical level, the threshold. Control then passes to step 450.

If it is determined in step 450 that there is another region at the current hierarchical level, then control passes back to step 440 to determine the fine-scale transformation for the next region. In some embodiments control passes back to step 430 to determine sub-volume specific MH bin size.

If it is determined in step 450 that there is not another region at the current hierarchical level, then control passes to step 490. In step 490 it is determined whether a further level of division is desirable. Any method may be used to determine whether a further level of division is desirable. In Walimbe, it is determined to halt further division when the number of scan elements in a region after further division is less than 16×16×16=$16^3$.

If it is determined in step 490 that a further level of division is desirable, then control passes back to step 420 to divide each undivided region. If it is determined in step 490 that a further level of division is not desirable, then control passes to step 492.

In step 492, coefficients of the transforms are associated with a canonical scan element in each finest scale region and interpolated to each scan element between canonical scan elements. In Walimbe, tri-linear interpolation is implemented for interpolation of scalar translation coefficients between canonical scan elements. Spherical linear interpolation (slerp) is used for quaternion interpolation, which is the equivalent of linear interpolation of scalars. In some embodiments these same interpolation schemes are applied during step 492.

In some embodiments, higher order cubic interpolation is used for the scalar coefficients during step 492. The spherical cubic interpolation for quaternion (squad) coefficients is used, which is the equivalent of cubic interpolation for scalars, as described in K. Shoemake, "Animating rotation with quaternion curves," *Comput. Graphics (Proc. of SIGGRAPH '85)* vol. 19, pp 245-254, 1985, the entire contents of which are hereby incorporated by reference as if fully set forth herein. This leads to a smooth continuous deformation field from results of sub-volume registration at the last, finest hierarchical level. The interpolated curve obtained using squad interpolation scheme has $C^1$ or tangential continuity.

In some embodiments, higher order transformations are used at one or more hierarchical levels. A new interpolation scheme is adopted for these models, involving transformations of different degrees of complexity. It is anticipated that, in such embodiments, a general-purpose technique is implemented based on Karcher means for averaging any transformation represented by homogenous transformation matrices. This technique determines a Karcher mean of multiple Jacobian matrices by minimizing a Riemannian metric on a Riemannian manifold through an iterative procedure. This technique is used for calculation of mean transformations for a variety of transformations including six-parameter rigid-body and affine, and ensures preservation of mathematical group properties of the transformation matrices. Karcher means are described in R. P. Woods, "Characterizing volume and surface deformations in an atlas framework: theory, applications, and implementation," *Neuroimage*, vol. 18, pp. 769-788, 2003; and in R. P. Woods, S. T. Grafton, J. G. D. Watson, N. L. Sicotte, and J. C. Mazziotta, "Automated image registration: II. Intersubject validation of linear and nonlinear models," *Journal of Computer Assisted Tomography*, vol. 22, pp. 153-165, 1998, the entire contents of each of which are hereby incorporated by reference as if fully set forth herein.

Control then passes to step 340 of method 300 to apply the transformation to register the floating scan data to the reference scan data.

3. Embodiments for Scan Data from Separate Devices

The application of some embodiments of method 300 and 400 to CT and PET scan data is described in R. Shekhar et al., "Automated Three-Dimensional Elastic Registration of Whole-body PET and CT from Separate or Combined Scannersa," The *Journal of Nuclear Medicine*, vol. 46, no. 9, pp 1488-1496, September 2005, (hereinafter Shekhar II) the entire contents of which are hereby incorporated by reference as if fully set forth herein.

As described in Shekhar II, one embodiment of the method was applied to fifteen image pairs consisting of PET and CT acquired on separate scanners. Contrast-enhanced CT images were acquired (on SOMATON PLUS from SIEMENS, New York, N.Y.) with a subject involved in breath-hold at maximum inspiration of the breathing cycle and arms stretched over the head. The subject was involved in normal breathing cycle with arms beside the body during PET image acquisition (ECAT HR+, SIEMENS, New York, N.Y.) lasting approximately 40-50 minutes. $^{18}$F-FDG was injected as radiotracer about 45-60 minutes prior to scanning. Depending on the scanner settings (for optimum magnification of anatomy of clinical interest) at the time of image acquisition, CT images measured 512×512×70-90 voxels with voxel dimensions in the range 0.9-1.2 mm×0.9-1.2 mm×5 mm. The typical image size for PET was 128×128×135-160 voxels, with cubic voxels of dimensions 5.15 mm×5.15 mm×5.15 mm. The attenuation-corrected PET emission scans, reflecting functional information for the entire body, generally had a larger field of view than corresponding CT images. The time difference between acquisition of CT and PET images varied from a few minutes for some cases to a few days for others, dictated by clinical need, availability of equipment, and clinical scheduling issues at the time of acquisition.

To achieve a trade-off between maintaining CT resolution and obtaining nearly isotropic voxels, the CT images were re-sampled for all cases to get nearly isometric voxels with dimensions 1.8-2.4 mm×1.8-2.4 mm×2.5 mm, depending on the original voxel dimensions. Re-sampling reduced the spatial resolution of CT images; however, the resulting images still had better spatial resolution than the PET images (the lower resolution image controls the accuracy of image registration in general) and nearly isotropic voxels. No preprocessing steps were employed for the PET images.

Global registration during step 410 used the six-parameter rigid-body transformation model based on maximization of NMI between the two images. A midpoint (octree) volume division was used during step 420. At each subdivision level, the floating image was registered with the individual subvolumes of the reference image, considered one at a time. Each subvolume registration continued until the iterative optimization process converged to a transformation solution (% NMI change <0.1), or maximum number of iterations (200) was reached. When all subvolume registrations at a given level were performed, the algorithm continued on to the next level of subdivision. Volume subdivision and subvolume registration continued while the voxel count for an individual subvolume remained above a predefined limit of $16^3$. This condition was selected based on the observation from pilot experiments for the given pair of modalities, which showed that over half the subvolume registrations with less than $16^3$ voxels per subvolume failed to converge to a solution, and thus did not significantly and robustly improve the existing registration. Subvolume registration also used a six-parameter rigid-body transformation model during step 440. Initial seeding of the undivided floating image with respect to each subvolume is given by the transformation obtained from registration involving the floating image and the corresponding parent subvolume at the previous level of division.

During calculation of NMI for any given subvolume registration, the prior registration information for all remaining parts of the image, available from the previous hierarchical level, was used. The prior information was assimilated into subvolume registration during calculation of NMI, by compiling the mutual histogram as a sum of two separate mutual histograms: $MH_{SUBVOLUME}$, calculated for the subvolume voxels and $MH_{PRIOR}$, calculated for all remaining voxels of the image, with transformations derived from the immediately preceding hierarchical level. The typical number of bins selected for the mutual histogram was 128×128, based on calculations of optimal bin width as described by Equation 1 during step 420.

If the result of a given subvolume registration caused the ECD to be greater than a preset threshold for that level, the solution was discarded and the transformation from the previous division level was retained in steps 442, 446 and 448. At each hierarchical level, this threshold was set equal to 25% of the smallest subvolume dimension at that level. This provided a constraint on the subvolume registration and aided in maintaining image integrity by preventing individual subvolumes from drifting far off from their starting positions at each hierarchical level.

After registration at the last, finest scale hierarchical level, the rigid-body transformations were assigned to the centers of the respective subvolumes. For every voxel in the reference image, a unique mapping transformation was determined by performing tri-cubic interpolation between the subvolume centers. The 3D translational component of the transformation is interpolated separately as three scalars, due to the independence of the translations along the three coordinate axes. Interpolation of 3D rotation in the quaternion domain was determined by converting the rotational matrices into quaternions. The concept of quaternions allows a unique and complete representation of 3D rotation with elegant formulations of a range of interpolation methods. The equivalent of cubic interpolation for quaternions called spherical cubic interpolation or squad (spherical quadrangle) was used to interpolate the quaternions. Next, using the transformation field, the original PET image was sampled and transformed to generate a continuous elastically transformed PET image that aligned well with the CT image.

The accuracy of the whole-body PET-CT registration was evaluated by comparing the alignment of a number of anatomic landmarks (3D locations within the images) as predicted by the algorithm against a reference. Due to the lack of a gold standard for this registration application, it is assumed that the ability of clinical experts to locate landmarks in both CT and PET images provides a suitable benchmark performance. This is done to assess whether the method performance is comparable to that of the experts.

Three clinical experts, experienced in interpreting whole-body PET and CT images, were involved in the validation procedure. All experts were blinded to the identities of the subjects. Each expert was asked to identify and mark anatomical landmarks identifiable in both the imaging modalities from a list of 32 well-described anatomical landmarks. Examples of anatomical landmarks are right and left lung apex, upper and lower tips of kidneys, dome of the liver, any cancerous nodule, etc. The experts were asked to mark as many landmarks as possible from this list, provided they were confident of identifying a given landmark in both CT and PET images. They, on average, spent 20-30 minutes marking all such landmarks in a pair of PET-CT images. Three thin-plate spline (TPS)-based elastic deformation fields were generated based on the homologous landmarks identified by the three experts, representing three respective expert-defined PET-CT elastic image registrations.

Figure 5:
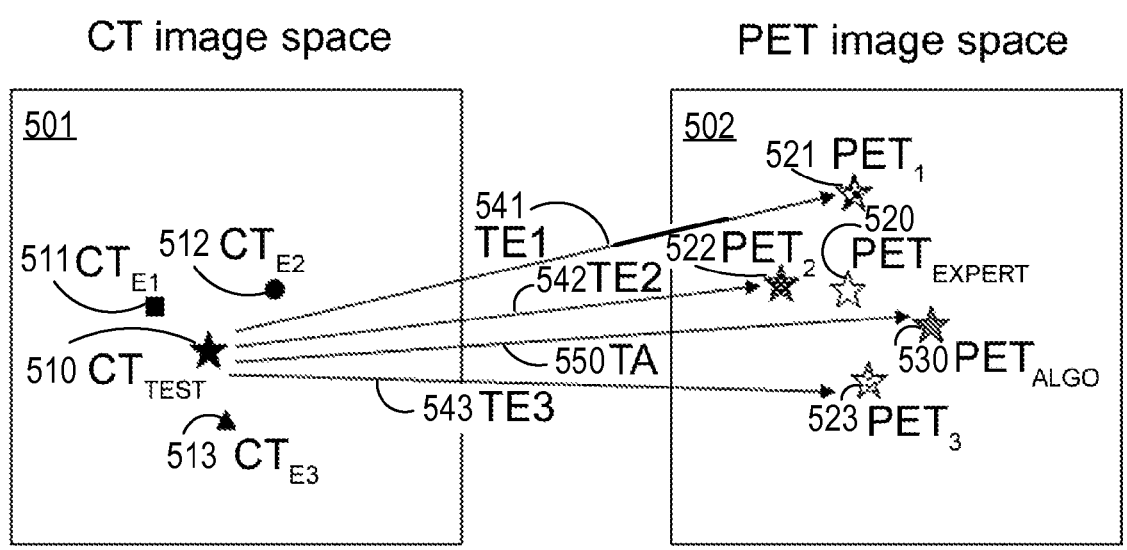
FIG. 5 is a block diagram that illustrates mapping of landmarks in a CT image and corresponding PET image.

Since the location of a specific landmark as marked by an expert varied slightly from expert to expert, a set of "test landmarks" was created for each case separately, by defining the location of each landmark as the centroid of the expert-defined locations for that landmark in CT. FIG. 5 is a block diagram that illustrates mapping of landmarks in s CT image and corresponding PET image. FIG. 5 includes a portion 501 of a CT image and a corresponding portion 502 of a PET image. The different locations of a particular landmark in the CT portion 501 as determined by the three experts are shown as expert 1 CT location 511, expert 2 CT location 512, and expert 3 CT location 513. The centroid 510 of the three expert CT locations 511, 512, 513 is also shown. The position of the centroid after transformation using the three thin-plate spline (TPS)-based elastic deformation fields is shown in the portion 502 of the PET image. These expert-transformed locations are shown as expert 1 PET location 521, expert 2 PET location 522, and expert 3 PET location 523. Also shown in portion 502 of the PET image is the centroid 520 of the three expert PET locations 521, 522, 523. The centroid 520 is called $PET_{EXPERT}$. Algorithm PET location 530 is also shown, called $PET_{ALGO}$. The algorithm transformation field determined in an illustrated embodiment from step 492 was used to determine each landmark in the PET image ($PET_{ALGO}$) representing the transformed locations of the test landmarks after the automatic elastic registration. Though the PET (floating) image is transformed to match the CT, transformations are always directed from CT image to PET image. Using these transformations, a matching PET location is found for each point in CT space, and thus a copy of PET image is created to match the CT image.

For each case, the mean error between $PET_{EXPERT}$ 520 and $PET_{ALGO}$ 530 was evaluated to quantify the registration accuracy for that case. To further evaluate the algorithm performance in the context of inter-expert variability, the four sets of PET points were allocated to separate groups of three sets each—Group 1 consisted of $PET_1$, $PET_2$, $PET_3$; Group 2 consisted of $PET_1$, $PET_2$, $PET_{ALGO}$; Group 3 consisted of $PET_1$, $PET_3$, $PET_{ALGO}$; and Group 4 consisted of $PET_2$, PET$_3$, PET$_{ALGO}$. For each group, the mean difference (Euclidean distance) in the transformed location of corresponding landmarks was obtained for all pair-wise combinations of sets of PET points within that group. The mean difference for each group was determined by averaging over all cases, including only those landmarks that have been identified by all experts in a given case. Comparable mean difference values obtained for all four groups is an indication of good agreement between the algorithm-determined registration of the illustrated embodiment and the three expert-determined registrations. Significantly increased (or decreased) value of the mean difference in transformed locations when algorithm replaces any expert would indicate that the algorithm-determined registration agrees less (or more) with the registration defined by that expert, respectively.

The results of the validation study were analyzed for the 15 cases involving images acquired on separate scanners. Decrease in the variability following elastic registration indicates the inability of combined PET/CT scanners to achieve perfect alignment and the ability of the illustrated embodiment of the invention to improve upon the result of purely mechanical alignment.

Registration was performed on a Dell workstation (Xeon 2.00-GHz processor, 2.00-GB RAM) running WINDOWS® XP Professional operating system from MICROSOFT of Redmond, Wash. For image pairs from separate scanners, average initial seeding of 75 mm in axial direction was provided to compensate for different scanner coordinate systems and ensure reasonable overlap of common regions in both images. No other initial seeding step was performed. All the image pairs registered visually correct. The average execution time for registration of a single dataset was approximately 75 minutes for images from the separate scanners.

Visual inspection, as described in Shekhar II indicates the ability of the registration algorithm to improve alignment of cancerous mass as seen in CT and PET images. The mean registration error (5.5 mm for images from separate scanners), calculated as PET$_{EXPERT}$–PET$_{ALGO}$, was found comparable to the mean inter-expert difference in landmark identification (5.6±2.4 mm) calculated using corresponding PET$_1$, PET$_2$, and PET$_3$. Statistical analysis using t-tests did not indicate statistically significant difference between the mean registration error and the mean inter-expert error for any of the cases, indicating that registration performed by the algorithm is comparable to the average expert-defined registration. To estimate the reproducibility of the algorithm-determined registration solution, the registration algorithm was implemented for a typical CT-PET pair, starting from 10 randomly generated initial misalignments (±15 voxels for translations and ±10 degree for rotations). The registration error (similar to the average error reported above) for all 10 attempts was within one voxel range of the average error for all attempts. This indicates the robustness of the algorithm and its relative independence of the initial misalignment.

Table 1 summarizes the analysis of the inter-expert variability in landmark identification averaged over the 15 cases having PET and CT from separate scanners. The results have been analyzed for the overall anatomy and then separately for the thoracic and abdominal regions of the anatomy. It can be seen from Table 1 that for a given region (overall/thoracic/abdominal), value of mean difference in transformed locations for any given group lies within the 95% confidence interval (CI) of the mean for the remaining three groups, indicating that the algorithm can replace any expert without increasing the inter-expert variability in registration. Based on these results it can be concluded that the performance of the algorithm-determined registration is comparable to all three expert-defined registrations.

TABLE 1

Inter-expert variability in landmark identification (illustrated embodiment and 3 experts) for CT and PET from separate devices

| Anatomical region | Inter-observer variability in landmark identification Mean (95% confidence interval) (mm) Maximum (mm) | | | |
|---|---|---|---|---|
| | Group 1 | Group 2 | Group 3 | Group 4 |
| Overall | 5.6 (4.9, 6.2) 11.2 | 5.8 (5.3, 6.5) 11.2 | 5.7 (5.1, 6.2) 10.9 | 6.0 (5.5, 6.5) 12.1 |
| Thoracic | 5.7 (5.0, 6.4) 10.9 | 6.2 (5.8, 6.7) 10.9 | 5.9 (5.3, 6.5) 10.9 | 6.1 (5.6, 6.7) 12.1 |
| Abdominal | 5.4 (4.2, 6.7) 11.2 | 5.0 (3.8, 6.1) 11.2 | 5.1 (3.9, 6.3) 10.7 | 5.3 (4.5, 6.1) 11.7 |

Our reported execution time of 75 minutes compares favorably with approximately 100 minutes for the multi-resolution free-form deformation (FFD)-based approach reported elsewhere for similar but smaller images (in-plane voxel count about a quarter of our images). This is because image subdivision-based approach (like ours) is computationally simpler (the transformation mode remains rigid locally) as compared to the FFD-based approach, making our algorithm more efficient to compute and hence faster without compromising accuracy.

4. Combined PET/CT Scanner Embodiment

The combined PET/CT scanners have simplified multimodality image registration and fusion. They have even sped up the overall scan time up to 40% using the CT scan for PET attenuation correction. Nonetheless, the underlying registration mode remains rigid, which cannot compensate for involuntary non-rigid motion of thoracic and abdominal organs. Differences arise mainly due to varying breathing patterns. Whereas CT is generally performed with breath-hold or shallow breathing, longer PET scans are performed with the subject engaged in normal breathing cycles. The resulting misalignment in whole-body images is especially pronounced in the area of the diaphragm. In fact, up to 96% of combined PET/CT examinations have been reported to contain respiratory motion artifacts, with a target registration error as high as 11 mm.

According to some embodiments of the invention, non-rigid registration is performed on scan data from combined PET/CT scanners to remove the residual registration errors.

In some embodiments, the non-rigid registration involves only coarse scale shear or coarse scale compression or both.

In some embodiments, the non-rigid registration involves adaptive sub-volume division, as described above with reference to FIG. 4, and in Shekhar II.

In Shekhar II, registration was performed for five cases consisting of PET and CT images acquired on a combined PET/CT scanner (BIOGRAPH SENSATION 16, SIEMENS, New York, N.Y.). During CT and PET image acquisition using the combined scanner, the subject was instructed to keep arms beside the body and perform shallow breathing. $^{18}$F-FDG was injected as radiotracer about 45-60 minutes prior to scanning. At the time of scanning, low dose non contrast-enhanced CT image was acquired first, followed by the PET image acquisition. No transmission PET scan was acquired, and the attenuation correction for PET was performed using the CT image. Typical image size for CT was 512×512×307–404 voxels with voxel size 0.78 mm×0.78 mm×2.5 mm, whereas typical image size for PET was 128× 128×154–202 voxels with voxel size 5.31 mm×5.31 mm×5 mm.

Registration was performed as described above for separate scanners. As stated above for image pairs from separate scanners, average initial seeding of 75 mm in axial direction was provided to compensate for different scanner coordinate systems and ensure reasonable overlap of common regions in both images. No such initial seeding was required for CT-PET from combined scanner. The average execution time for registration of a single dataset was approximately 45 minutes for images from the combined scanner. The shorter execution time for registration of PET-CT images from the combined scanner is anticipated because of the higher degree of misalignment expected for images from the separate scanners as compared to the images from the combined scanner.

For the five combined PET/CT cases, the mean difference values are tabulated for mechanical registration against the experts before presenting similar data for the algorithm employing the illustrated embodiment. Decrease in the variability following elastic registration indicates the inability of combined PET/CT scanners to achieve perfect alignment and the ability of this embodiment of the invention to improve upon the mechanical alignment.

Visual inspection, as described in Shekhar II indicates the residual misalignment in PET-CT images acquired on the combined scanner and the subsequent improvement in image alignment registration with the illustrated embodiment. The mean registration error (5.9 mm), calculated as $PET_{EXPERT}-PET_{ALGO}$, was found comparable to the mean inter-expert difference in landmark identification (6.6±3.4 mm, respectively) calculated using corresponding $PET_1$, $PET_2$, and $PET_3$. Statistical analysis using t-tests did not indicate statistically significant difference between the mean registration error and the mean inter-observer error for any of the 5 cases, indicating that registration performed by the illustrated embodiment is comparable to the average expert-defined registration Table 2 summarizes the inter-expert variability averaged over all landmarks for the 5 cases having PET and CT images acquired using the combined PET/CT scanner. In Table 2, the original (mechanical) registration of the combined PET/CT scanner and the illustrated embodiment are compared separately with the registration performed by the experts. An unchanged mean difference value whenever the algorithm-determined registration was included in a group indicates that the algorithm performed on a par with the experts' view of optimal alignment. On the other hand, a larger mean difference value, whenever the mechanical registration was included in a group, indicates that the mechanical alignment of the combined PET/CT performed slightly worse compared with the experts' view of optimal alignment. Overall better 'embodiment-expert' agreement (lower mean difference value) as compared to 'mechanical registration-expert' agreement is evident from the statistically significant improvement (t-test, $\alpha=0.05$) in the mean difference values for Groups 2-4 in Table 2 when mechanical registration was replaced with the illustrated embodiment. The difference between the illustrated embodiment and the mechanical registration is also statistically significant for registration in the thoracic region, but not so for the abdominal region, indicating that both registrations are comparable for features of the abdominal anatomy, using the illustrated embodiment. This result may represent a limitation of validation using expert opinion. It is anticipated that, when the underlying deformation is accurately quantified with a better standard, then some embodiment of the automatic registration is superior to mechanical registration even in the abdominal region.

TABLE 2

Inter-expert variability in landmark identification (mechanical registration or illustrated embodiment and 3 experts) for CT and PET from combined device

| | Anatomical region | Scanner (Mechanical registration) | Illustrated Embodiment (Elastic registration) | p value |
|---|---|---|---|---|
| | | Inter-observer variability in landmark identification Mean (95% confidence interval) (mm) Maximum (mm) | | |
| Group 1 | Overall | 6.6 (5.9, 7.2) 12.3 | 6.6 (5.9, 7.2) 12.3 | — |
| | Thoracic | 7.2 (6.6, 7.9) 12.3 | 7.2 (6.6, 7.9) 12.3 | — |
| | Abdominal | 5.5 (4.5, 6.5) 11.6 | 5.5 (4.5, 6.5) 11.6 | — |
| Group 2 | Overall | 7.0 (6.4, 7.7) 14.3 | 6.0 (5.5, 6.6) 14.1 | p < 0.05 |
| | Thoracic | 8.1 (7.4, 8.8) 14.3 | 6.8 (6.2, 7.4) 11.9 | p < 0.05 |
| | Abdominal | 5.4 (4.4, 6.4) 12.9 | 4.8 (3.9, 5.8) 14.1 | NS |
| Group 3 | Overall | 7.2 (6.6, 7.9) 12.9 | 6.1 (5.5, 6.6) 12.3 | p < 0.05 |
| | Thoracic | 8.3 (7.5, 9.1) 12.9 | 6.8 (6.1, 7.5) 12.3 | p < 0.05 |
| | Abdominal | 5.5 (4.5, 6.5) 11.6 | 4.8 (4.1, 5.7) 11.6 | NS |
| Group 4 | Overall | 8.2 (7.5, 8.9) 13.1 | 6.5 (5.9, 7.1) 11.7 | p < 0.05 |
| | Thoracic | 9.5 (8.6, 10.4) 12.5 | 7.5 (6.7, 8.2) 11.7 | p < 0.05 |
| | Abdominal | 6.2 (5.0, 7.5) 13.1 | 5.2 (4.0, 6.4) 10.9 | NS |

5. General Purpose Computer Overview

FIG. 6 is a block diagram that illustrates a computer system 600 upon which an embodiment of the invention may be implemented. Computer system 600 includes a communication mechanism such as a bus 610 for passing information between other internal and external components of the computer system 600. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 610 includes many parallel conductors of information so that information is transferred quickly among devices coupled to the bus 610. One or more processors 602 for processing information are coupled with the bus 610. A processor 602 performs a set of operations on information. The set of operations include bringing information in from the bus 610 and placing information on the bus 610. The set of operations also typically include comparing two or more units of information, shifting positions of units of information, and combining two or more units of information, such as by addition or multiplication. A sequence of operations to be executed by the processor 602 constitute computer instructions.

Computer system 600 also includes a memory 604 coupled to bus 610. The memory 604, such as a random access memory (RAM) or other dynamic storage device, stores information including computer instructions. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of computer instructions. The computer system 600 also includes a read only memory (ROM) 606 or other static storage device coupled to the bus 610 for storing static information, including instructions, that is not changed by the computer system 600. Also coupled to bus 610 is a non-volatile (persistent) storage device 608, such as a magnetic disk or optical disk, for storing information, including instructions, that persists even when the computer system 600 is turned off or otherwise loses power.

Information, including instructions, is provided to the bus 610 for use by the processor from an external input device 612, such as a keyboard containing alphanumeric keys operated by a human user, or a sensor. A sensor detects conditions in its vicinity and transforms those detections into signals compatible with the signals used to represent information in computer system 600. Other external devices coupled to bus 610, used primarily for interacting with humans, include a display device 614, such as a cathode ray tube (CRT) or a liquid crystal display (LCD), for presenting images, and a pointing device 616, such as a mouse or a trackball or cursor direction keys, for controlling a position of a small cursor image presented on the display 614 and issuing commands associated with graphical elements presented on the display 614.

In the illustrated embodiment, special purpose hardware, such as an application specific integrated circuit (IC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and receives electrical, acoustic or electromagnetic signals, including infrared and optical signals, that carry information streams, such as digital data. Such signals are examples of carrier waves.

The term computer-readable medium is used herein to refer to any medium that participates in providing information to processor 602, including instructions for execution. Such a medium may take many forms, including, but not limited to, non-volatile media, volatile media and transmission media. Non-volatile media include, for example, optical or magnetic disks, such as storage device 608. Volatile media include, for example, dynamic memory 604. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 678 typically provides information communication through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690. A computer called a server 692 connected to the Internet provides a service in response to information received over the Internet. For example, server 692 provides information representing video data for presentation at display 614.

The invention is related to the use of computer system 600 for implementing the techniques described herein. According to one embodiment of the invention, those techniques are performed by computer system 600 in response to processor 602 executing one or more sequences of one or more instructions contained in memory 604. Such instructions, also called software and program code, may be read into memory 604 from another computer-readable medium such as storage device 608. Execution of the sequences of instructions contained in memory 604 causes processor 602 to perform the method steps described herein. In alternative embodiments, hardware, such as application specific integrated circuit 620, may be used in place of or in combination with software to implement the invention. Thus, embodiments of the invention are not limited to any specific combination of hardware and software.

The signals transmitted over network link 678 and other networks through communications interface 670, which carry information to and from computer system 600, are exemplary forms of carrier waves. Computer system 600 can send and receive information, including program code, through the networks 680, 690 among others, through network link 678 and communications interface 670. In an example using the Internet 690, a server 692 transmits program code for a particular application, requested by a message sent from computer 600, through Internet 690, ISP equipment 684, local network 680 and communications interface 670. The received code may be executed by processor 602 as it is received, or may be stored in storage device 608 or other non-volatile storage for later execution, or both. In this manner, computer system 600 may obtain application program code in the form of a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to an infra-red signal, a carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

6. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for adaptive non-rigid registration of multiple measurement modes of a target body, comprising the steps of:

receiving first data comprising a first plurality of measured values each associated with a plurality of coordinate values for spatial or temporal dimensions based on a first measurement mode of a target body;

receiving second data comprising a second plurality of measured values each associated with a plurality of coordinate values for spatial or temporal dimensions based on a different second measurement mode of the target body;

determining a linear transformation to maximize a coarse scale similarity measure between the first data and the second data;

sub-dividing the second data into a plurality of sub-regions each comprising a spatially or temporally contiguous subset of the second data;

determining a plurality of non-rigid transformations to maximize a fine scale similarity measure between the plurality of sub-regions and a plurality of corresponding portions of the first data wherein the non-rigid transformations include shear and at least one of compression or expansion; and transforming the plurality of coordinate values for each measured value of the second data based on the plurality of non-rigid transformations.

2. A method as recited in claim 1, wherein both the coarse scale similarity measure and the fine scale similarity measure are based on normalized mutual information.

3. A method as recited in claim 1, wherein the second measurement mode uses the same sensing system as the first measurement mode but at a different time.

4. A method as recited in claim 1, wherein the second measurement mode uses positron emission tomography (PET) and the first measurement mode uses X-ray computer tomography (CT).

5. A method for adaptive non-rigid registration of multiple measurement modes of a target body, comprising:

receiving first data comprising a first plurality of measured values each associated with a plurality of coordinate values for spatial or temporal dimensions based on a first measurement mode of a target body;

receiving second data comprising a second plurality of measured values each associated with a plurality of coordinate values for spatial or temporal dimensions based on a different second measurement mode of the target body;

determining a linear transformation to maximize a coarse scale similarity measure between the first data and the second data;

sub-dividing the second data into a plurality of sub-regions each comprising a spatially or temporally contiguous subset of the second data;

determining a plurality of non-rigid transformations to maximize a fine scale similarity measure between the plurality of sub-regions and a plurality of corresponding portions of the first data;

repeating said steps of sub-dividing the second data and determining a plurality of non-rigid transformations until conditions for further sub-dividing the second data are no longer satisfied, wherein non-rigid transformations for the last-formed sub-regions are each associated with a canonical position within a corresponding last-formed sub-region;

interpolating fine scale transformations to positions between canonical positions; and transforming the plurality of coordinate values for each measured value of the second data based on the plurality of non-rigid transformations.

6. A non-transitory computer-readable medium carrying one or more sequences of instructions for adaptive non-rigid registration of multiple measurement modes of a target body, wherein execution of the one or more sequences of instructions by one or more processors causes the one or more processors to perform the steps of:
- receiving first data comprising a first plurality of measured values each associated with a plurality of coordinate values for spatial or temporal dimensions based on a first measurement mode of a target body;
- receiving second data comprising a second plurality of measured values each associated with a plurality of coordinate values for spatial or temporal dimensions based on a different second measurement mode of the target body;
- determining a linear transformation to maximize a coarse scale similarity measure between the first data and the second data;
- sub-dividing the second data into a plurality of sub-regions each comprising a spatially or temporally contiguous subset of the second data;
- determining a plurality of non-rigid transformations to maximize a fine scale similarity measure between the plurality of sub-regions and a plurality of corresponding portions of the first data wherein the non-rigid transformations include shear and at least one of compression or expansion; and
- transforming the plurality of coordinate values for each measured value of the second data based on the plurality of non-rigid transformations.

7. An apparatus comprising:
- means for receiving first data comprising a first plurality of measured values each associated with a plurality of coordinate values for spatial or temporal dimensions based on a first measurement mode of a target body;
- means for receiving second data comprising a second plurality of measured values each associated with a plurality of coordinate values for spatial or temporal dimensions based on a different second measurement mode of the target body;
- means for determining a linear transformation to maximize a coarse scale similarity measure between the first data and the second data;
- means for sub-dividing the second data into a plurality of sub-regions each comprising a spatially or temporally contiguous subset of the second data;
- means for determining a plurality of non-rigid transformations to maximize a fine scale similarity measure between the plurality of sub-regions and a plurality of corresponding portions of the first data wherein the non-rigid transformations include shear and at least one of compression or expansion; and
- means for transforming the plurality of coordinate values for each measured value of the second data based on the plurality of non-rigid transformations.

* * * * *